United States Patent [19]
Letemps et al.

[11] Patent Number: 5,236,487
[45] Date of Patent: Aug. 17, 1993

[54] PROCESS AND DEVICE FOR THE PRODUCTION OF CURVED GLASS SHEETS

[75] Inventors: Bernard Letemps, Thourotte, France; Cesar Mauri, Milan, Italy

[73] Assignee: Saint-Gobain Vitrage International, Courbevoie, France

[21] Appl. No.: 748,888

[22] Filed: Aug. 23, 1991

[30] Foreign Application Priority Data

Aug. 23, 1990 [FR] France ............... 90 10585

[51] Int. Cl.[5] ........................................... C03B 23/033
[52] U.S. Cl. .............................. 65/104; 65/106; 65/107; 65/268; 65/273
[58] Field of Search ............... 65/104, 106, 107, 268, 65/273, 275, 286, 287

[56] References Cited

U.S. PATENT DOCUMENTS

| | | | |
|---|---|---|---|
| 3,529,947 | 9/1970 | Frank | 65/273 |
| 4,381,933 | 5/1983 | Schultz et al. | 65/106 |
| 4,540,425 | 9/1985 | Bocelli et al. | 65/273 |
| 4,556,406 | 12/1985 | Kahle | 65/106 |
| 4,853,018 | 8/1989 | Koss et al. | 65/106 |
| 4,957,528 | 9/1990 | Letemps et al. | 65/104 |

FOREIGN PATENT DOCUMENTS

| | | |
|---|---|---|
| 0263030 | 4/1988 | European Pat. Off. |
| 373265 | 6/1990 | European Pat. Off. |
| 2221409 | 10/1974 | France |
| 2442219 | 6/1980 | France |

Primary Examiner—Joye L. Woodard
Attorney, Agent, or Firm—Oblon, Spivak, McClelland, Maier & Neustadt

[57] ABSTRACT

A process for bending glass sheets, preheated to bending temperature, includes passing the glass sheets along a longitudinal trajectory having substantially the form of a cone of revolution in a shaping bed having substantially the form of a cone of revolution.

21 Claims, 2 Drawing Sheets

PROCESS AND DEVICE FOR THE PRODUCTION OF CURVED GLASS SHEETS

BACKGROUND OF THE INVENTION

Field of the Invention

This invention concerns techniques for the production of curved, and possibly thermally toughened, glass sheets, notably those that are curved to complex, non-cylindrical shapes. More particularly, the invention relates to such techniques in which the glass sheets are caused to pass over a shaping bed composed of shaping rods, for example revolving elements disposed along a path having a profile that is curved in the direction of travel of the glass sheets. The invention may be applied, for example, to the production of automobile glazing, for instance of the side window type.

Description of the Related Art

These toughening-bending techniques are known, for example from French Patent 2 242 219, which discloses preheating the glass sheets to their softening temperature, then causing them to pass along a conveyor which continues without interruption along a path from the furnace. The conveyor forms a shaping bed passing through a toughening final zone and being composed of revolving elements disposed along a path of curved profile. In practice the curved profile is a circular profile having a concavity preferably facing upwards. In this case, the trajectory followed by the glass sheet is therefore not plane but cylindrical, the generatrices of the cylinder being horizontal and preferably perpendicular to the direction of feed of the glass, the latter being brought flat into the installation.

The radius of the path of the revolving elements corresponds to the radius of curvature imparted to the glass sheet in the direction parallel to the direction of travel. To this first curvature there may be added a secondary curvature, obtained by the use of revolving elements that are not composed of non-curved straight shafts but are shaped rollers (for example of the S-bend type), bulging rollers in conjunction with diabolos, or shafts with contraflexure. Depending upon the curvature of the revolving elements, it is possible to create toroidal shapes, the radius of curvature of which varies from one meter to infinity for the principal curvature and from 20 meters to infinity for the secondary curvature, infinity corresponding to straight rollers and therefore to a cylindrical shape.

These techniques, which act on glass sheets continuously in movement, may be carried out at very high production rates as a result of the high speed of travel, generally not less than 10 meters per second, if only to prevent deformations in the glass between the rollers and, by reason of the fact that there is nothing to prevent glass sheets separated by only a few centimeters from following one another. But this advantageous production rate is achieved at the price of limiting the glass shapes that can be produced in this manner, which must be exclusively toroidal (a cylinder or torus of revolution but with a secondary radius of curvature most commonly large by comparison with the principal radius of curvature).

If this toroidal form is in practice the most common one in panes intended for the side doors of automobiles, it is nevertheless not the only one used and designers are today developing many automobile models in which some of the panes are of complex shape, notably with a radius of curvature that is not constant in a given direction. It is at present only possible to produce these panes by application against a curving mold and/or by release onto a curving frame, which requires an interruption in the travel of the glass sheets and a relatively wide spacing between them (while a first sheet is being curved, the curving tool is not available throughout the duration of curving, whereas in an installation such as that described in French Patent 2 242 219 the outer edge of one glass sheet may enter the shaping zone while the rear edge of the preceding sheet is still in that zone).

Apart from this limiting aspect to the rates of production, the problem must also be faced of perfect management of the curvature effectively imparted during bending and of the prevention of any parasitic deformation due, for example, to the sagging of the glass under its own weight. These parasitic deformations generally occur during the transfer of the glass sheet from the bending station to the toughening station and are frequently more difficult to avoid where the curvature given to the glass sheet is small, which means that the glass sheet still has a very strong tendency to bend, which is difficult to control. Moreover, panes of complex shape are not necessarily highly curved panes. The bending-toughening processes on a shaping bed having a curved profile provide a very satisfactory solution to this problem of controlling the curvature by reason of the permanent support for the glass sheets by the rollers and the fact that the glass sheets are toughened immediately after they are curved without needing to be transferred from a bending station to a toughening station.

SUMMARY OF THE INVENTION

An object of the present invention is to widen the range of shapes of panes that can be produced industrially from a bending-toughening installation operating by passage of the glass sheets over a shaping bed defining a trajectory having a curved profile in the direction of travel of the glass, for example with the objective of creating with this type of installation virtually all the panes which may be mounted on the sides and rear of automobile vehicles.

This object may be achieved by causing the glass sheets, preheated to the bending temperature, to travel on a shaping bed along a fixed trajectory having a curved profile substantially corresponding to a cone of revolution. Preferably, the lead end of this conical trajectory is coplanar with the plane trajectory of the glass sheets in the furnace, thus avoiding discontinuities. In other words, the glass sheet follows a trajectory which is preferably ascending and inclined to the side.

The path followed by the glass sheet is generated by an assembly of lines radiating from a single center constituting the apex of the cone, the straight line connecting two points aligned on a perpendicular to the axis of the furnace at their entry into the bending station merging with a straight line joining an assembly of homothetic points. Preferably, these curves are ellipses or circles, such that the path followed by the glass sheet is carried by a conical surface having an ellipsoidal or circular base. In the case of a cone of revolution, a radius of curvature is therefore obtained, which is constant longitudinally but varies continuously transversely to the trajectory of the glass sheet.

Furthermore, a transverse secondary curvature may be added to this principal curvature acquired by the longitudinal trajectory.

Following this curving operation, the glass sheets undergo a controlled cooling for the purpose of maintaining stability of form. This cooling is, for example, of the thermal toughening type, in the case of panes intended to be fitted to the lateral or rear panels of automobile vehicles; it may also be carried out as a relatively mild cooling, for simply restoring the glass sheet to low temperature for the purpose, for instance, of assembling panes by lamination.

Preferably, the driving of the glass sheet is effected in such a way that the times of passage for all the points of the surface of the glass sheet are identical, even if a non-planar trajectory requires different distances to be travelled for two different points that simultaneously enter the shaping bed and are therefore situated on the same perpendicular to the furnace axis. A point toward the inside of the central trajectory, since it has a shorter distance to travel, will thus be driven more slowly than an external point having a longer distance to travel. In this way skidding or slipping phenomena are avoided, which otherwise tends to degrade the optical quality of the panes produced.

The invention also has as an object a machine for bending glass sheets, comprising a substantially conical shaping bed, which preferably has a leading end coplanar with the plane defined by the upper generatrices of the feed conveyor for the glass sheets.

Preferably, this machine is also equipped in known manner with toughening blowing chests, the nozzles of which are directed between the last shaping rods so that the glass sheet is simultaneously curved and toughened or, more accurately, its rear part is curved while its front, already curved, part is toughened; although it may be remembered that the invention is not necessarily linked to the production of toughened (quenched) panes and that these toughening blowing chests may be replaced by cooling means adapted for reducing the temperature of the glass sheet below the curving temperature for the purpose of fixing its final shape.

Depending upon whether or not it is desired to give a secondary curvature to the glass sheet, shaping rods such as rollers rotating about fixed axes will be used in which the bearing lines of the glass sheets are non-rectilinear or rectilinear, for thereby forming a substantially conical surface or a surface that effectively is of the cone of revolution type. In the former case, it will be possible to use revolving elements of the paraboloid of revolution type or, again, curved rods surrounded by revolving sheaths, elements of this type being well known to the person skilled in the art, notably from Patent FR-B-1 476 785. It should be noted that asymmetric curved rods may be employed for creating certain specific shapes. In the second case, the shaping rods have a rectilinear bearing line; they will then preferably be composed of revolving elements of the roller type. For the purpose of equalizing the durations of travel of all the points on the surface of the glass sheet, truncated conical rollers will preferably be used, at least in the zone of bearing of the glass sheets—and possibly having straight ends, which simplifies their assembly and rotational driving.

Where the shaping bed is conical with a concavity preferably facing upwards, which is more specifically adapted for the case of glass sheets enamelled, for example, around their periphery for the purpose of mounting by gluing, the friction of the glass sheet against the revolving elements of the shaping rods may be insufficient for correctly driving the glass sheet, especially at the toughening blowing zone, if present, where it will be necessary to overcome not only the force exerted by the weight of the glass, but also the force opposing advance of the glass as the result of the barrier formed by the cold air blowing perpendicularly onto the surface of the glass sheet. In this case, the bending machine should be equipped with elements disposed above the shaping rods and cooperating with them for the purpose of causing the glass sheets to advance. These upper elements may be constructed identically to the lower elements forming the shaping bed.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
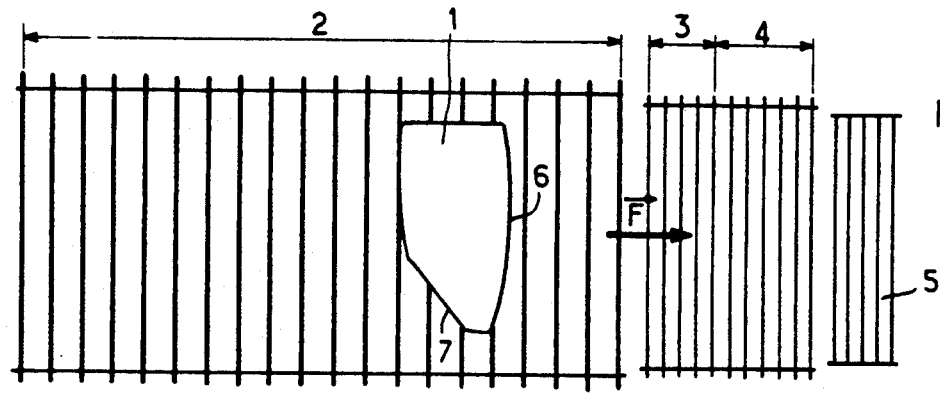
FIG. 1 is a schematic view from above of a conventional curving line, comprising a shaping bed having a cylindrical longitudinal curvature, for the purpose of creating a pane shape of the type indicated schematically in FIG. 1A.
Figure 1A:
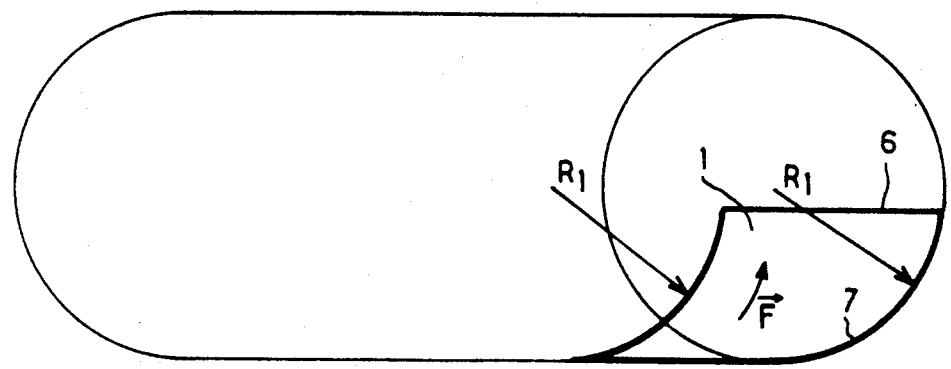

FIGS. 1 and 1A illustrate a conventional curving line known from FR-B-2 242 219, only the conveying elements being shown for reasons of clarity. According to this device, the glass sheet 1 first passes through a reheating zone 2, where it is carried by a horizontal conveyor composed of a series of driving rollers. At the exit from the reheating zone 2, its temperature now being greater than or equal to its bending temperature, the glass sheet enters the bending zone 3 in which the rollers are mounted according to a longitudinally cylindrical profile having a radius $R_1$. The rollers thus form a shaping bed preferably having its concavity facing upwards and with travel (from left to right in FIG. 1) on this bed; the glass sheets thus acquire the cylindrical curvature with a radius of curvature $R_1$, produced under the combined action of gravity, of possible upper elements and of their speed. The bending zone 3 is followed by a toughening (quenching) zone 4, in which the rollers are likewise disposed along a circular cylinder of radius $R_1$. The toughened glass sheets are finally removed by a plane conveyor 5, a tilting device possibly being used to facilitate their exit from the toughening zone 4.

Perpendicularly to the principal curvature of radius $R_1$, and therefore in the case shown in FIG. 1A along the straight edges 6, it is possible if desired to give to the glass sheet a secondary curvature of radius $r_3$ (not shown), where $r_3$ is preferably greater than 20 meters, this limit being related to technical considerations relative to the construction of shaped rollers. But it is important to note that this second curvature is perpendicular to the principal curvature applied to the edges 7.

Figure 2:
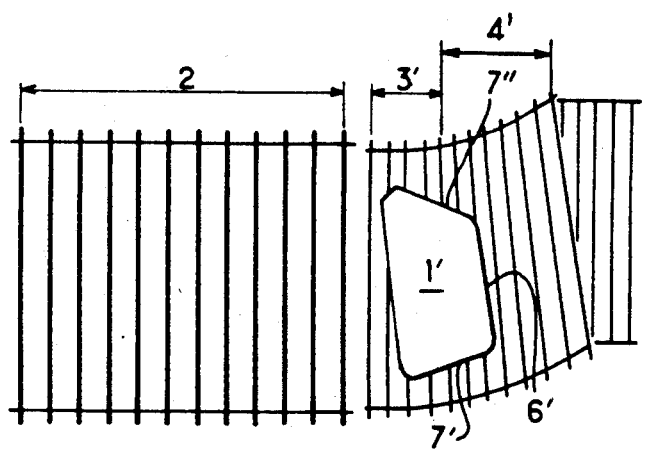
FIG. 2 is a schematic view from above of a curving line, comprising a shaping bed according to this invention, for the purpose of creating a pane shape of the type shown schematically in FIG. 2A.
Figure 2A:
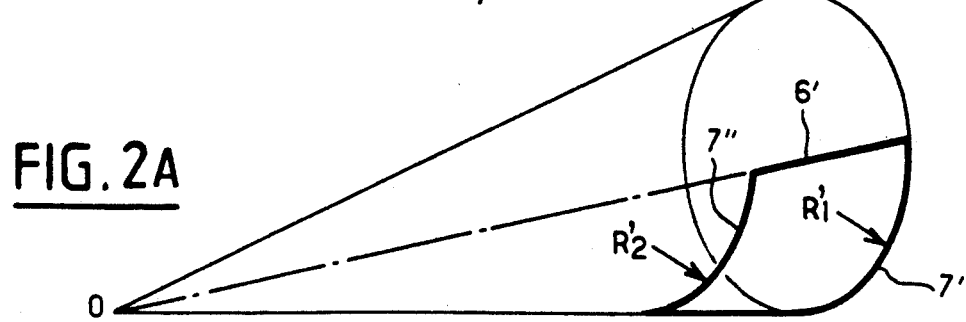

FIGS. 2 and 2A illustrate the invention. On leaving the reheating zone 2, identical to the zone 2 of FIG. 1, the glass sheet 1' enters the shaping zone 3', in which shaping rods are arranged according to a conical profile with apex O. The glass sheet 1' thus passes over a shaping bed of the "banked turn" type, which not only displaces it vertically but also causes it to undergo a rotation. This leads to a conical pane shape, having a principal curvature which varies continuously along a line 6', initially perpendicular to the axis of the furnace, the outer edge 7' having, in this example, a radius of curvature $R_1'$ and the inner edge a smaller radius of curvature $R_2'$, where the terms "outer" and "inner" relate to the cone center O and the radii of curvature $R_1'$ and $R_2'$ lie typically between 1 meter and infinity.

The shaping zone 3' is, as before, followed by a toughening zone 4', the rollers of which are disposed as a continuation of those of the shaping zone 3'. The toughened glass sheet 1' is subsequently removed by a conveyor 5', or preferably two conveyors, the first of which reorientates the glass sheet along the axis of the production line, although other systems of removal may also be envisaged, for example those with a suction cup arm.

If the shaping rods have a bearing surface against the glass which is straight, the edges 6' parallel to the rollers of the furnace 2' are not curved. In contrast, a transverse secondary curvature of a radius $r_3$ may be imparted by the use of shaping rods which are curved along their lengths, such as for example paraboloids of revolution.

Figure 3:
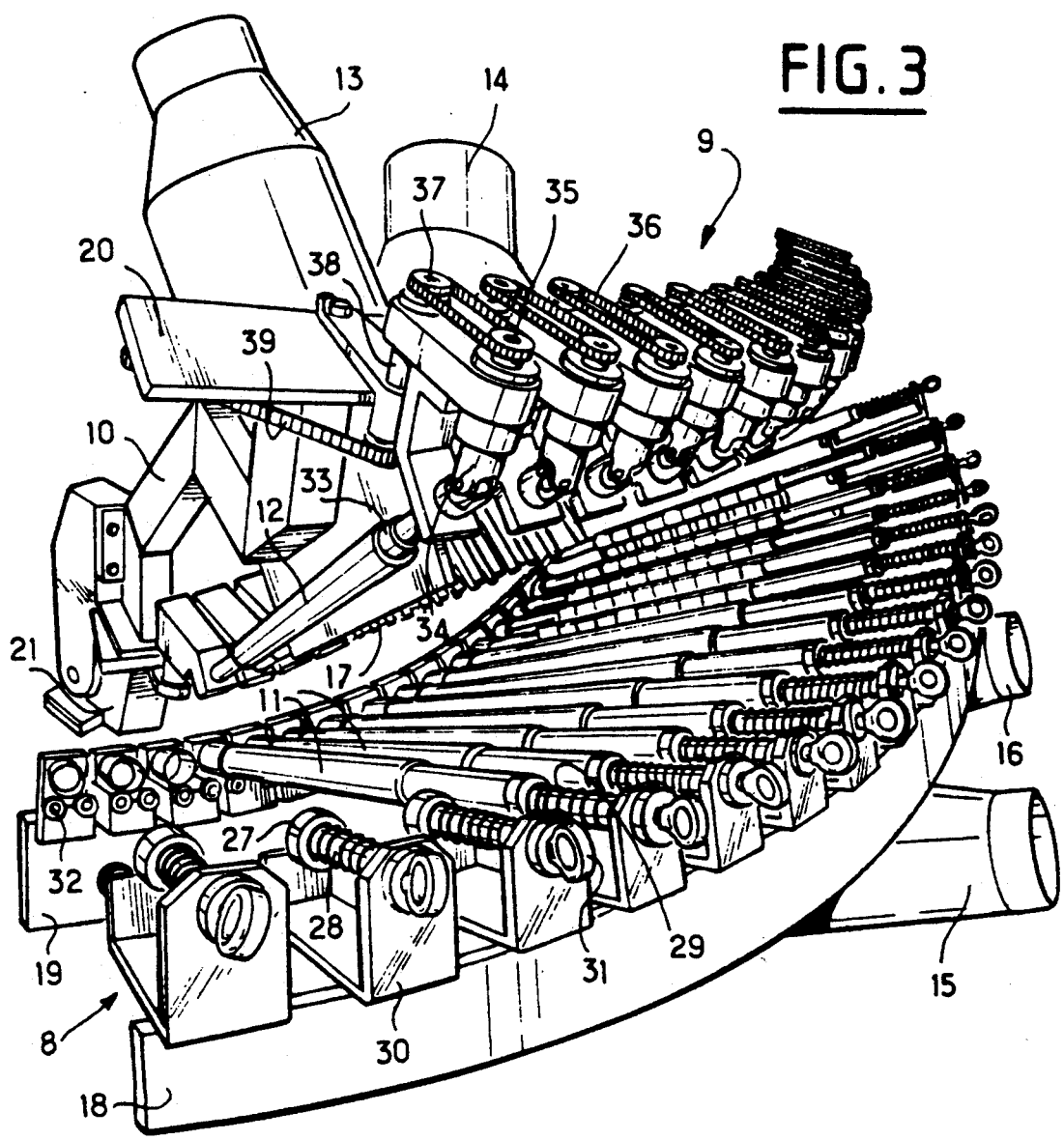
FIG. 3 is a schematic perspective view of a curving or bending machine according to this invention, with the upper part raised.

FIG. 3 shows essential elements of a bending machine according to this invention, illustrated here half-open in a maintenance position to enable the shaping bed to be more easily seen. This bending machine, the width of which depends upon the maximum size of glass sheets to be bent, is preferably mounted on a carriage carried by wheels, thus forming an easily replaced, autonomous unit.

The bending machine is composed of a lower assembly 8 and an upper assembly 9, carried by an articulated arm 10, making possible opening of the machine through which the glass travels from left to right in the figure, therefore rising.

In the case illustrated here, the lower assembly 8 comprises 17 shaping rods 11, the first three having been removed. The very first of these rods may, in fact, constitute the last roller of the conveyor bringing the glass sheets through the reheating furnace, i.e., its generatrix, on which the glass sheet rests, is precisely in the plane defined by the upper generatrices of the rollers of the furnace, such a measure making it possible to avoid the forming of a discontinuity which would later result in an optical defect.

The upper assembly 9 likewise comprises 17 shaping rods 12, of which only the first is clearly distinguishable in FIG. 3. The surface generated by the shaping rods 11 or 12, respectively, is conical. When the machine is closed, the space between two opposite rods 11 and 12 is substantially equal to the thickness of the glass sheet.

The 2×7 first rollers, counting from the end nearest the furnace, constitute the shaping zone proper. Beyond this, the toughening or, more generally, cooling zone commences. For this purpose, between the shaping rods 11 and 12 are arranged blowing nozzles 17, supplied with compressed air through ducts 13, 14, 15 and 16, to which are attached pipes permanently fixed in the factory. The quantity of blown air should be sufficient for providing to the glass sheet, during its time of passage, a thermal toughening or quenching in conformity with the most severe automobile standards. In this zone use may be made, in known manner, of shaping rods that are thinner and are equipped with rings on which the glass sheets run.

All the shaping rods 11 of the lower element are mounted in such a way that the generatrices defining the shaping bed for the glass sheet are converging. To achieve this, the bearings for the shaping rods are mounted on outer and inner arcs 18 and 19, composed of curved metal girders. In this way, a conical shaping bed is defined, composed of shaping rods 11 which are all interchangeable, since they are all identically designed and of the same length.

In the same manner, the shaping rods 12 of the upper assembly are mounted on outer and inner arcs 20 and 21.

Figure 4:
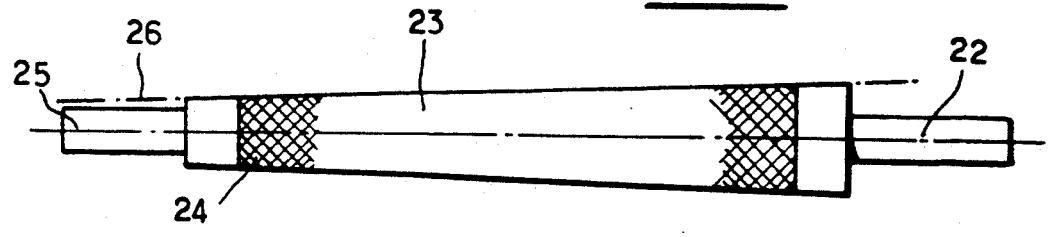
FIG. 4 shows a roller especially adapted for the construction of the shaping bed of this invention.

As can be seen in more detail in FIG. 4, each shaping rod 11, 12 is composed of a core 22 surrounded by a truncated conical body 23, the assembly being constructed, for example, of a stainless steel. The truncated conical part, on which the glass sheets run, is preferably faced with a tubular sheath made of a fabric 24 of silica fibers or other refractory fibers with elastic meshes, the sheath being preferably pulled onto the truncated conical body 23 without being glued, and being held at its ends. The fabric absorbs the dust which could penetrate between the glass sheet and the truncated conical body 23, thus preventing the formation of pin pricks and furthermore preventing the glass sheet from slipping.

Since the outer arc has a larger radius, the glass sheet must travel through a longer distance, at its outer edge, than that which it travels at the edge of the inner arc. It is, nevertheless, preferable for the dwell time in the apparatus to be identical for two points that enter it simultaneously, since otherwise the inner portion of the pane would undergo a notably lesser toughening than the outer part. Contrary to the general practice in this field, it is therefore advantageous here to drive the glass sheet at a speed that is directly proportional to the length to be travelled or, in other words, at a speed that is modulated transversely to the direction of travel. It is this which can be very accurately achieved by a roller of truncated conical shape, the tangential velocity of which is clearly variable along its length and is larger as the diameter becomes greater. It is understood that the first roller of the machine must then be mounted, not with its axis of rotation 25 aligned to the axes of rotation of the cylindrical rollers of the furnace, but with its upper generatrix 26 aligned to the upper generatrices of the rollers of the furnace, which of course implies installation with the axis 25 slightly raised on the inner side of the machine. The other shaping rods are, likewise, mounted slightly inclined with their upper generatrices lying on a cone intersected by sections of radii $R_1'$ and $R_2'$, converging towards a common point.

The mounting of the shaping rods 11 and 12 is illustrated in FIG. 3. One of the ends is fixed in a sleeve 27, mounted at the end of a freely rotatable axle 28. The sleeve 27 is pressed onto the rod 11 by a spring 29. The axle 28 is, furthermore, placed on a bearing 30, fixed directly to the arc 18 and is in addition equipped with a handle 31 which enables the spring 29 to be pulled back and the shaping rod to be rapidly disengaged for the purpose of replacing it. At its other end, the inner side for the shaping rods 11 and the outer side for the shaping rods 12 of the upper element, each rod is guided by two roller bearings 32 and is fixed in a sleeve 33 which, by an articulated transmission 34, transmits the rotational movement of a toothed wheel 35, driven by a chain 36 driven in turn by a toothed wheel 37 actuated, via a connecting shaft 38, by a chain 39 common to all the connecting shafts 38 of a single lower or upper element.

Of course, the rollers could also be driven by the kinetic energy of the glass sheets.

This method of mounting thus enables all the shaping rods to be driven at the same speed, in a reliable manner and although their bearings are not coplanar.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A process of treating preheated glass sheets, comprising the steps of:
   bending the glass sheets by passing the glass sheets along a fixed longitudinal trajectory formed from a plurality of revolving elements and having substantially the form of a cone of revolution; and
   cooling the bent glass sheets by blowing cool air thereon while continuing to pass the glass sheets along said longitudinal trajectory.

2. The process of claim 1, including the step of positioning an end of said trajectory coplanar to the path of glass sheets exiting a heating furnace.

3. The process of claim 1, wherein said bending step includes applying a secondary curvature to said glass.

4. The process of claim 1, wherein said trajectory rises along the length thereof.

5. The process of claim 1, including toughening said glass sheets during said cooling step.

6. The process of claim 1, wherein said cooling step comprises gradually cooling said glass sheets.

7. The process of claim 1, wherein in said bending and cooling steps the glass sheets are passed along said trajectory such that all parts of each glass sheet have an equal duration in said bending step and have an equal duration in said cooling step.

8. The process of claim 1, wherein said cone of revolution is a circular cone.

9. An apparatus for treating preheated glass sheets, comprising a shaping bed formed of a plurality of rotating elements and having substantially the form of a cone of revolution, and means incorporated into the shaping bed for cooling the glass sheets by blowing cool air thereon.

10. The apparatus of claim 9 including means for moving heated glass sheet along said shaping bed, whereby said glass sheets are bent to the form of the shaping bed.

11. The apparatus of claim 10 positioned adjacent a glass furnace, wherein a leading end of said shaping bed, with respect to a moving direction of the glass sheets, is substantially coplanar with glass sheets being discharged from the adjacent glass furnace.

12. The apparatus of claim 10, wherein said cone of revolution forms an upwardly directed concavity.

13. The apparatus of claim 10, including a downstream receiving conveyor.

14. The apparatus of claim 10, wherein said elements are comprised by shaping rods.

15. The apparatus of claim 14, wherein each of said shaping rods is symmetrical along its length.

16. The apparatus of claim 14, wherein all of the shaping rods are identical in shape.

17. The apparatus of claim 14, wherein each of said shaping rods comprises a roller.

18. The apparatus of claim 17, wherein said rollers each comprise a truncated cone.

19. The apparatus of claim 17, wherein said cooling means comprises two toughening blowing chests, the nozzles of which are directed between downstream ones of the rollers.

20. The apparatus of claim 17, wherein said means for moving comprise upper elements disposed above the shaping bed.

21. The apparatus of claim 20, wherein said means for moving comprise an articulated transmission.

* * * * *